United States Patent
Ren et al.

(10) Patent No.: US 12,194,438 B2
(45) Date of Patent: Jan. 14, 2025

(54) PREPARATION METHOD FOR CARBON CAPTURE MATERIAL BY NEEDLE-TUBE MICROFLUIDICS

(71) Applicant: University of Nottingham Ningbo China, Ningbo (CN)

(72) Inventors: Yong Ren, Ningbo (CN); Maxine Yew, Ningbo (CN)

(73) Assignee: University of Nottingham Ningbo China, Ningbo (CN)

( * ) Notice: Subject to any disclaimer, the term of this patent is extended or adjusted under 35 U.S.C. 154(b) by 265 days.

(21) Appl. No.: 17/553,388

(22) Filed: Dec. 16, 2021

(65) Prior Publication Data

US 2022/0234028 A1     Jul. 28, 2022

(30) Foreign Application Priority Data

Jan. 26, 2021 (CN) .......................... 202110105778.9

(51) Int. Cl.
| | |
|---|---|
| *B01J 20/28* | (2006.01) |
| *B01J 20/04* | (2006.01) |
| *B01J 20/20* | (2006.01) |
| *B01J 20/22* | (2006.01) |
| *B01J 20/26* | (2006.01) |
| *B01J 20/32* | (2006.01) |

(52) U.S. Cl.
CPC ....... *B01J 20/28021* (2013.01); *B01J 20/043* (2013.01); *B01J 20/20* (2013.01); *B01J 20/22* (2013.01); *B01J 20/262* (2013.01); *B01J 20/3225* (2013.01); *B01J 20/3293* (2013.01)

(58) Field of Classification Search
CPC .... B01J 20/28; B01J 20/28021; B01J 20/043; B01J 20/20; B01J 20/22; B01J 20/262; B01J 20/3225; B01J 20/3293
USPC .......................................................... 502/5
See application file for complete search history.

(56) References Cited

FOREIGN PATENT DOCUMENTS

CN     106698404 A   *   5/2017

* cited by examiner

*Primary Examiner* — Edward M Johnson
(74) *Attorney, Agent, or Firm* — Laurence A. Greenberg; Werner H. Stemer; Ralph E. Locher

(57) ABSTRACT

Disclosed are a carbon capture material prepared by needle-tube microfluidics and a preparation method thereof. The carbon capture material includes a sorbent and a microencapsulating shell, the sorbent includes one of an aqueous potassium carbonate solution or an aqueous ethanolamine solution or an aqueous ethanolamine solution containing graphene sheets, and the aqueous potassium carbonate solution or the aqueous ethanolamine solution or the aqueous ethanolamine solution containing graphene sheets is prepared by a microfluidic device. One of the aqueous potassium carbonate solution or the aqueous ethanolamine solution or the aqueous ethanolamine solution containing graphene sheets is used as a sorbent to prepare carbon capture particles by the microfluidic technology for the first time.

5 Claims, 6 Drawing Sheets

PREPARATION METHOD FOR CARBON CAPTURE MATERIAL BY NEEDLE-TUBE MICROFLUIDICS

CROSS REFERENCE TO RELATED APPLICATION

This patent application claims the benefit and priority of Chinese Patent Application No. 202110105778.9 filed on Jan. 26, 2021, the disclosure of which is incorporated by reference herein in its entirety as part of the present application.

TECHNICAL FIELD

The present disclosure relates to the technical field of combining microfluidics and carbon capture, and specifically relates to a carbon capture material prepared by needle-tube microfluidics and a preparation method thereof.

BACKGROUND ART

Microencapsulated sorbent (MECs, microencapsulated carbon sorbent) is a kind of microcapsules containing carbon dioxide sorbents (carbon solvents). The carbon dioxide sorbent is encapsulated in a thin polymer shell with a diameter of less than 1000 μm and a shell thickness of less than 100 μm. This research was initiated by Lawrence Livermore National Laboratory (LLNL) in 2013. In particular, the study explored the use of MECS for post-combustion capture to remove carbon dioxide in flue gas, such as carbon dioxide from power plants. MECS is believed to increase the specific surface area of carbon dioxide sorption, thereby improving the absorption kinetics of solvents, such as carbonate solutions with slower reaction kinetics, and can be used to encapsulate advanced solvents with complex characteristics. Microfluidic technology based on droplets is a useful technology for the material synthesis of droplet template, which has good control over the size and morphology of the droplets. Current MECS are prepared by using conventional glass capillaries, therefore having certain limitations in performance.

SUMMARY

In order to solve the above technical problems, aiming at the above shortcomings of the prior art, the present disclosure provides a carbon capture material prepared by needle-tube microfluidics where a simple microfluidic method is used to synthesize MECS and the size and morphology of droplets may be well controlled.

In order to solve the above technical problems, the present disclosure provides the following technical schemes: a carbon capture material prepared by needle-tube microfluidics, comprising an sorbent and a microencapsulating shell, wherein the sorbent comprises an aqueous potassium carbonate solution or an aqueous ethanolamine solution or an aqueous ethanolamine solution containing graphene sheets, and the aqueous potassium carbonate solution or the aqueous ethanolamine solution or the aqueous ethanolamine solution containing graphene sheets is prepared by a microfluidic device.

In some embodiments, the needle-tube microfluidic device of the present disclosure includes an internal phase microfluidic channel, an intermediate phase microfluidic channel and an external phase microfluidic channel; the internal phase microfluidic channel is used for the flow of the sorbent, the intermediate phase microfluidic channel is used for the flow of the silicone acrylate, and the external phase microfluidic channel is used for the flow of a glycerol solution; the internal phase microfluidic channel is arranged coaxially with the intermediate phase microfluidic channel and is located in the intermediate phase microfluidic channel, and the discharge end of the internal phase microfluidic channel is shorter than that of the intermediate phase microfluidic channel; the external phase channel is a cross-shaped channel, and the internal phase microfluidic channel and the intermediate phase microfluidic channel are located in a branch pipe of the external phase channel and extended into the cross position; the external phase is introduced from another two branch pipes perpendicular to the internal phase microfluidic channel and the intermediate phase microfluidic channel, and led out together with the internal phase and the intermediate phase from the branch pipe on the opposite side of the intermediate phase channel.

With the above structure, the flow rate of each phase and the shear force during collision could be effectively controlled, wherein the inner diameter of the internal phase is arranged to be smaller than that of the intermediate phase so as to facilitate the formation of stable dripping of the internal phase. At the same time, taking the factors such as the flow rate, the interfacial tension and viscosity of the internal and intermediate phases and co-flow into consideration, the structure with the above inner diameters is more reasonable, and the carbon capture particles finally obtained have a stronger sorption capacity.

As shown in the above figures: 1. internal phase microfluidic channel, 2. intermediate phase microfluidic channel 3. external phase microfluidic channel, 4. glass capillary, 5. blocking material.

Figure 4:
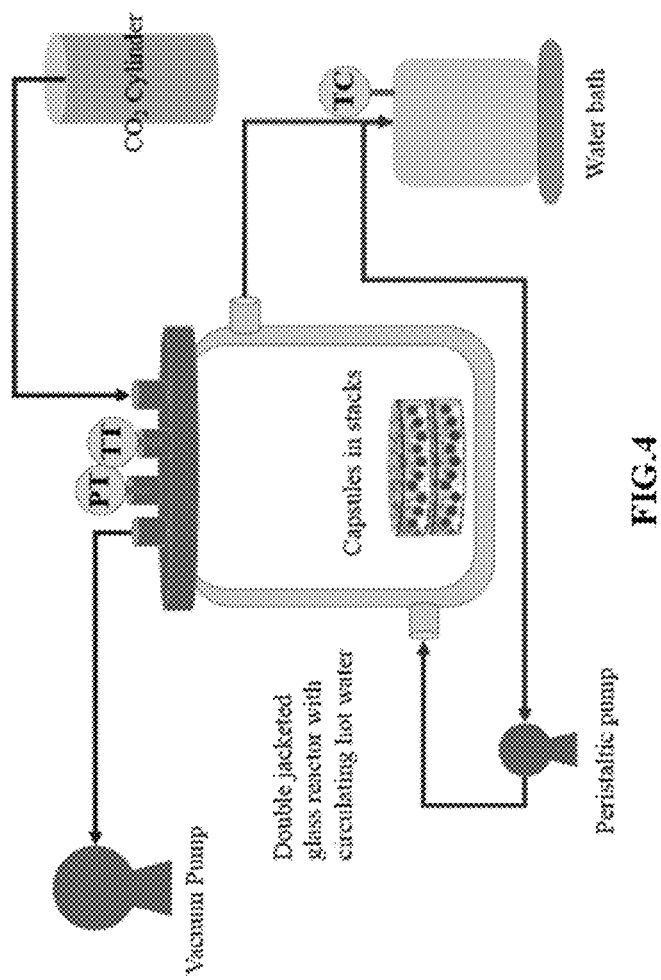

FIG. 4 shows a pressure drop setup.

Figure 5:
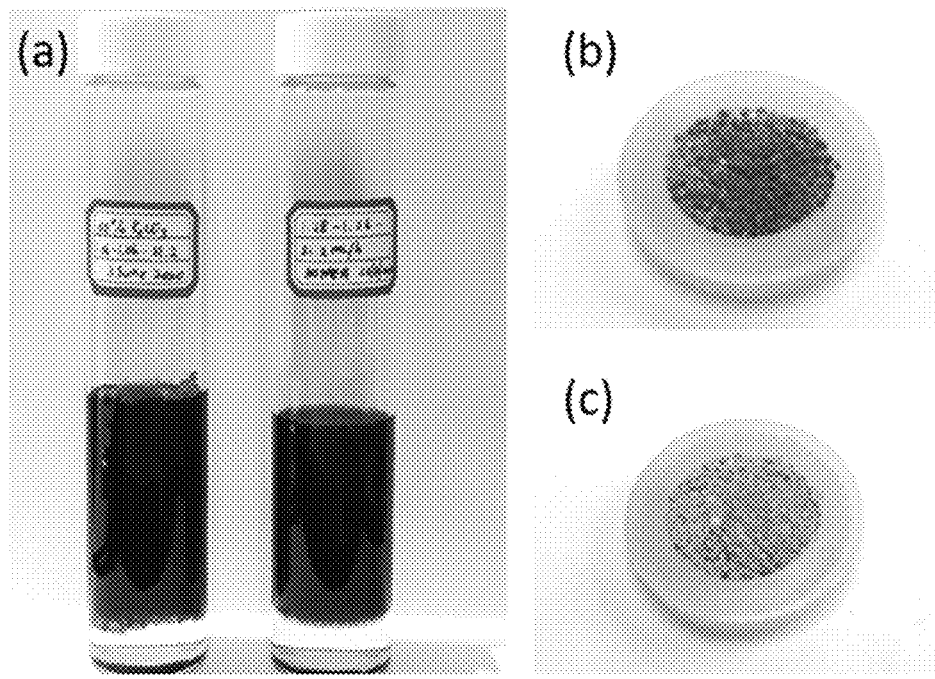

FIG. 5 shows (a) MECS placed in isotonic solvents; (b) MECS containing an acid-base indicator; (c) achievement of carbon dioxide sorption by showing color change of the acid-base indicator. In FIG. 5(a), the left vial is charged with a MECS-containing aqueous potassium carbonate solution, the right vial is charged with a MECS-containing aqueous ethanolamine solution, and the acid-base indicators of m-cresol purple and thymol blue are added. Color change is observed after $CO_2$ uptake due to the change in acidity from blue and purple (FIG. 5(b)) to yellow (FIG. 5(c)).

Figure 6:
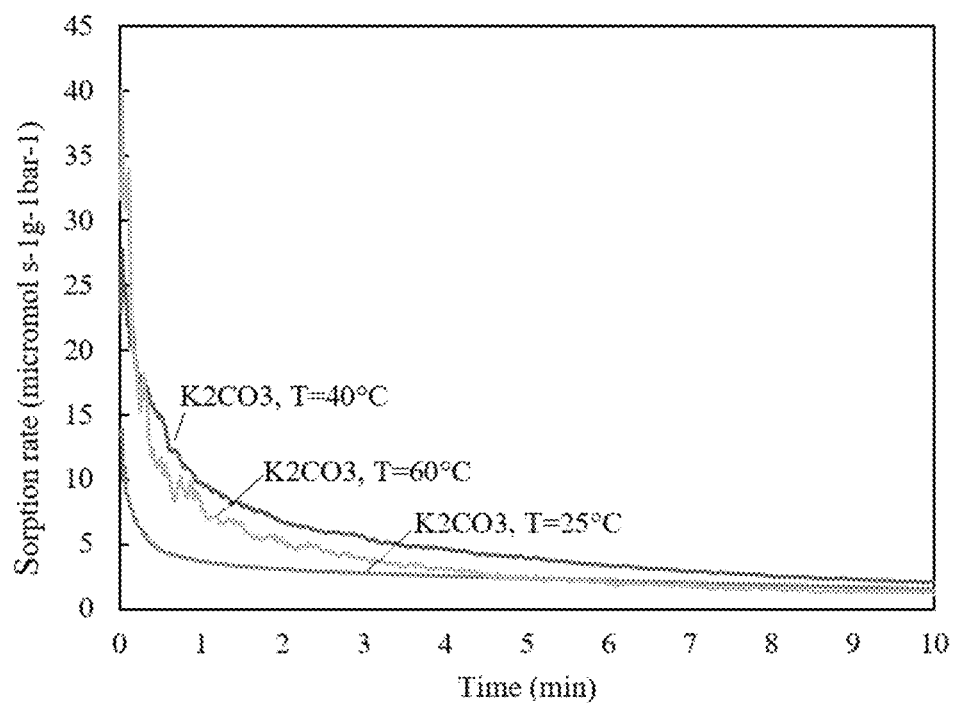

FIG. 6 shows carbon dioxide sorption effect of microencapsulated potassium carbonate at 25° C., 40° C. and 60° C.

Figure 7:
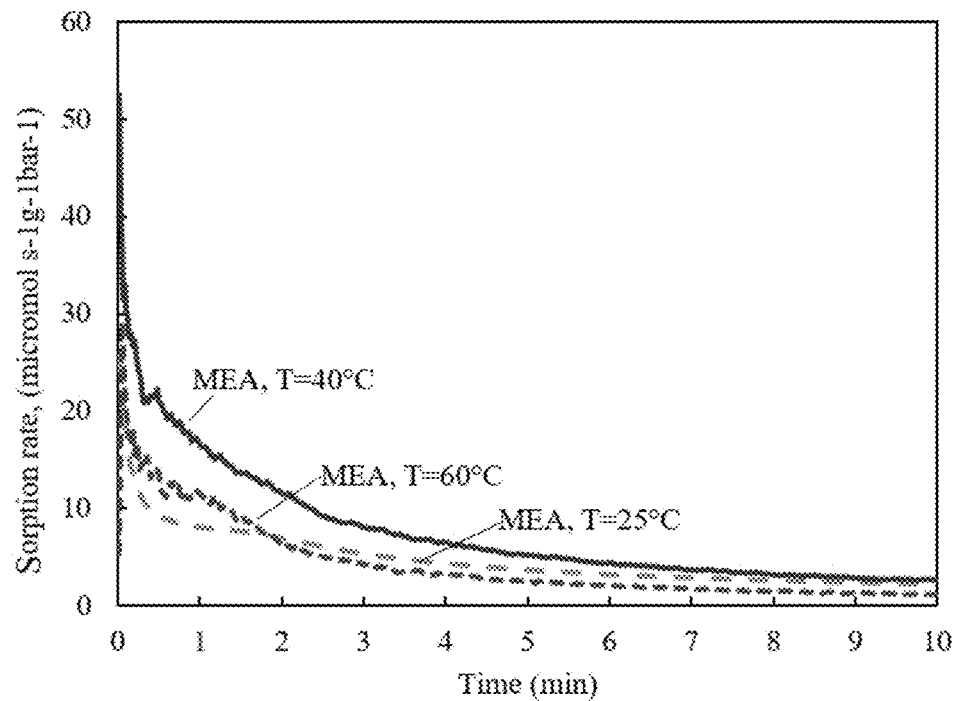

FIG. 7 shows carbon dioxide sorption effect of microencapsulated ethanolamine at 25° C., 40° C. and 60° C.

Figure 8:
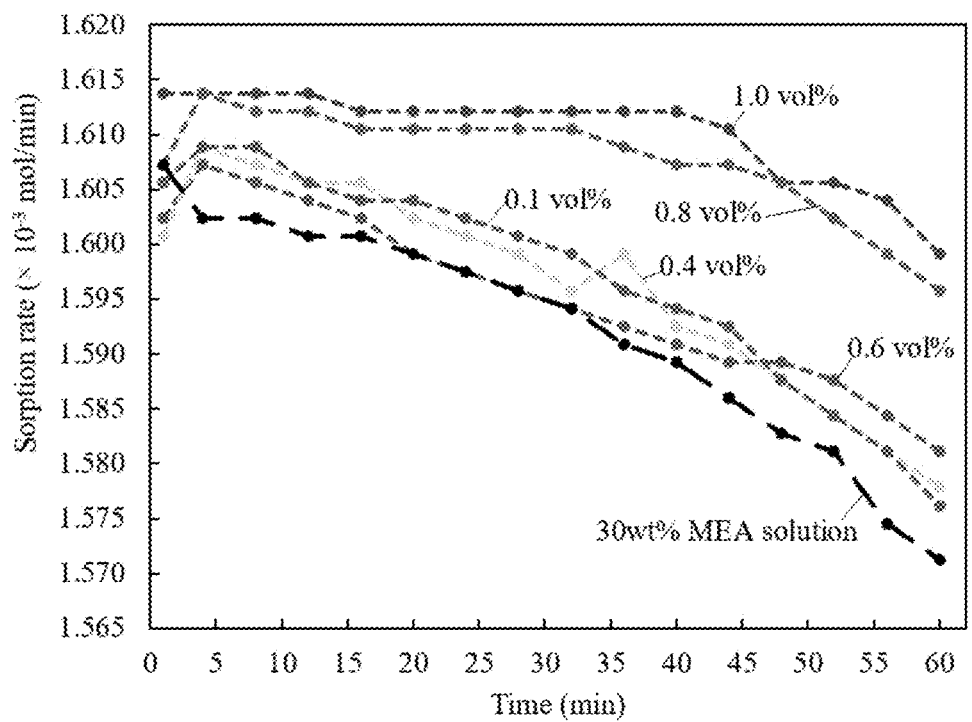

FIG. 8 shows the effect of nanoparticle loading on carbon dioxide sorption rate.

Figure 9:
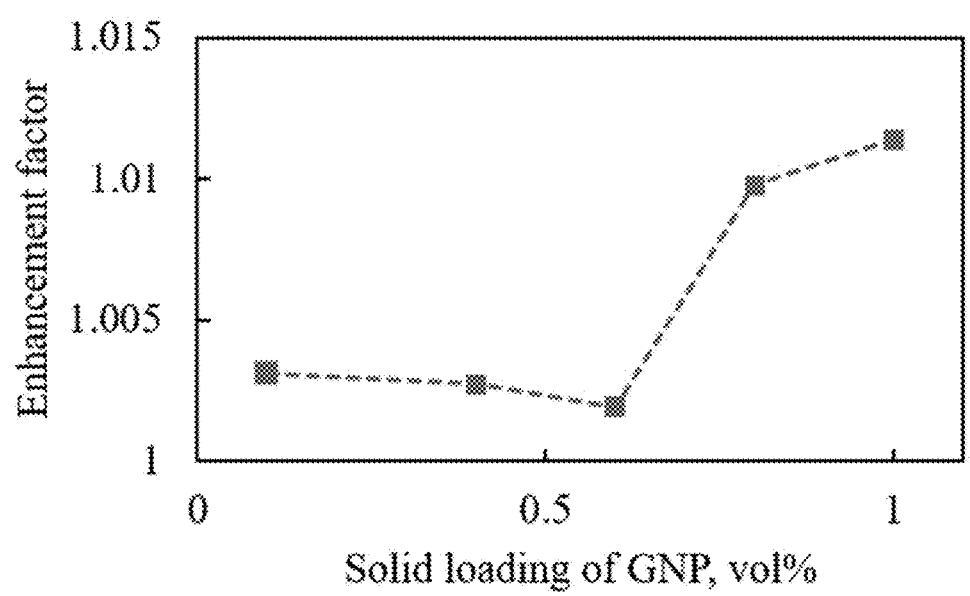

FIG. 9 shows the comparison of carbon dioxide sorption enhancement coefficient with nanoparticle loading.

DETAILED DESCRIPTION OF THE EMBODIMENTS

Technical solutions in the examples of the present disclosure will be clearly and completely described below with reference with examples and drawings. It is evident that the described examples are only preferred examples and not all of them. Based on the examples of the present disclosure, all other examples obtained by ordinary of skilled in the art without creative labor shall fall within the protection scope of the present disclosure.

In addition, it should be noted that when a component is referred to as being "fixed" to another component, it could be directly on the other component or there could also be another intermediate component that is fixed by the intermediate component. When a component is considered to be "connected" to another component, it could be directly connected to the other component or another intermediate component may also exist at the same time. When a component is considered to be "disposed" on another component, it may be directly disposed on another component or another intermediate component may also exist at the same time. The terms "vertical", "horizontal", "left", "right" and similar expressions used herein are for illustrative purposes only. Unless otherwise defined, all technical and scientific terms used herein have the same meaning as commonly understood by those skilled in the technical field of the present disclosure. The terms used in the specification of the present disclosure herein are only for the purpose of describing specific examples, and are not intended to limit the present disclosure. The terms "and/or" comprises any and all combinations of one or more related single items.

In the present disclosure, the carbon capture material prepared by needle-tube microfluidics comprises a sorbent and a microencapsulating shell, wherein the sorbent, as an inner phase, acts as a solvent for carbon sorption. In the context of the present disclosure, the terms "sorbent", "carbon dioxide sorbent" and the like may also be referred to as "carbon solvent", which are equivalent in meaning. In addition, the term "sorbent" may also be understood as for example "liquid sorbent", which has the same meaning in the context of the present disclosure as well. Likewise, the term "microencapsulating shell" may also be referred to as "polymeric shell", which is equivalent in meaning.

In some embodiments, the mass percentage of potassium carbonate in the aqueous potassium carbonate solution or the mass percentage of ethanolamine in the aqueous ethanolamine solution is in a range of 25-35%, and more preferably 30%.

In some embodiments, the aqueous ethanolamine solution containing graphene sheets is obtained by adding graphene into an aqueous ethanolamine solution and performing an ultrasonic treatment at 35-45° C. for 1-2 h, and the aqueous ethanolamine solution has a mass percentage of ethanolamine of 25-35%. The above operation is to ensure that the nanoparticles are distributed evenly in the solvent.

In some embodiments, the microencapsulating shell in the carbon capture material prepared by needle-tube microfluidics of the present disclosure comprises silicone acrylate (silicone acrylate—an Evonik product with a model of TEGO RAD 2650, which is a "photocrosslinkable" polymer).

In some embodiments, the silicone acrylate contains a photoinitiator 2-hydroxy-2-methylacetone.

In some embodiments, the content of the photoinitiator 2-hydroxy-2-methylacetone in the mixture of the silicone acrylate and the photoinitiator is in a range of 3-8% by mass percentage, and more preferably 5%.

In some embodiments, a glass capillary is arranged in a branch pipe on the opposite side of the internal phase microfluidic channel and the intermediate phase microfluidic channel in the external phase microfluidic channel, the end of the glass capillary is extended into the cross position of the external phase microfluidic channel, and the external phase, the internal phase and the intermediate phase are led out from the glass capillary. With such a structure, the flow rate of the corresponding phases in each pipe and the shear force during collision could be more reasonably controlled. Moreover, the glass capillary itself is hydrophilic, while the intermediate phase-formed double emulsion is hydrophobic, and thus the capillary realizes the export of the double emulsion for UV curing.

In some embodiments, the inner diameter of the glass capillary is greater than that of the intermediate phase microfluidic channel. The reason for using such a structure is that the particles formed would not adhere to the channel with a greater inner diameter of the capillary, so that the more complete and neater carbon capture material particles could be formed.

In some embodiments, a spacing is arranged between the end of the glass capillary at the cross position and the end of the intermediate phase microfluidic channel at the cross position. With such a structure, it is possible to control various shear forces of fluid by arranging the spacing, which is more conducive to the formation of the carbon capture particles.

In some embodiments, the end of the intermediate phase microfluidic channel extended into the cross position is located at half or more of the inner diameter of the channel for introducing the external phase. That is, the discharge end of the intermediate phase microfluidic channel should be located at half of the cross position of the external phase microfluidic channel or extended further toward the discharge end position. Such an arrangement could ensure a more desirable shear force of each phase, so as to achieve the formation of more desirable carbon capture particles.

In some embodiments, a blocking material is arranged between the intermediate phase microfluidic channel and the external phase microfluidic channel, and a blocking material is arranged between the glass capillary and the external phase microfluidic channel. With such a structure, after being introduced from the two sides perpendicular to the intermediate phase, the external phase flows only to the side of the glass capillary, and forms the co-flow from the internal phase and the intermediate phase into the carbon capture particles through a shear force.

The present disclosure has the following advantages and beneficial effects:

1. In the present disclosure, one of the aqueous potassium carbonate solution or the aqueous ethanolamine solution or the aqueous ethanolamine solution containing graphene sheets is used as a sorbent to prepare carbon capture particles by the microfluidic technology for the first time. The microfluidic technology and the sorbent structure of specific components provide a fast and cheap way to set up a microfluidic platform and to prepare an emulsion. The particles with such a structure have a higher carbon dioxide sorption rate, and especially, the introduction of graphene makes it possible to utilize the convective motion in fluid to enhance the sorption efficiency of the sorbent containing nanoparticles.

2. The present disclosure mainly uses the technology above to prepare a new type of microencapsulated sorbent. The sorbent component in the microencapsulation comprises ethanolamine and a nanofluid. The present disclosure uses the needle-tube microfluidic technology to prepare microencapsulated sorbents containing three different solvents, respectively, namely (1) the aqueous potassium carbonate solution microencapsulated with LLNL, (2) the aqueous ethanolamine solution, and (3) the aqueous ethanolamine solution containing graphene sheets (abbreviated as nanofluids). The microencapsulated sorbents effectively enrich the types of the existing microencapsulated sorbents, and the particles obtained achieve a more desirable sorption effect.

3. In the present disclosure, the control of various shear forces of the formed fluids could be achieved by using the specific arrangement of the internal phase, the intermediate phase and the external phase in combination with the specific structure of the microfluidic device, especially the arrangement of the position of the intermediate phase microfluidic channel and the inner diameter and position of each microfluidic channel, which is more conducive to the formation of carbon capture particles. In addition, a glass capillary is arranged, which is hydrophilic, and the intermediate phase formed-double emulsion is hydrophobic. The capillary thus allows the export of the double emulsion for UV curing. A greater inner diameter of the capillary is arranged to mainly prevent the formed particles from adhering to the channel, so that a more complete and neater carbon capture material could be formed.

EXAMPLE

A carbon capture material prepared by needle-tube microfluidics in the present disclosure was prepared, which comprised an sorbent and a microencapsulating shell. The sorbent was wrapped in the microencapsulating shell. Specifically, the sorbent comprised one of an aqueous potassium carbonate solution or an aqueous ethanolamine solution or an aqueous ethanolamine solution containing graphene sheets, and the aqueous potassium carbonate solution or the aqueous ethanolamine solution or the aqueous ethanolamine solution containing graphene sheets was prepared by a microfluidic device.

In the present disclosure, the mass percentage of potassium carbonate in the aqueous potassium carbonate solution or the mass percentage of ethanolamine in the aqueous ethanolamine solution was in a range of 25-35%. In the example, the mass percentage was set as 30%, which could be achieved by dissolving potassium carbonate or ethanolamine in water to prepare an aqueous solution with the above concentration.

In the present disclosure, the aqueous ethanolamine solution containing graphene sheets was obtained as follows: graphene was added into an aqueous ethanolamine solution and an ultrasonic treatment was performed at 40° C. for 1-2 h. The aqueous ethanolamine solution had a mass percentage of ethanolamine of 30%. The above operation was to ensure that the nanoparticles were distributed evenly in the solvent.

In the present disclosure, the microencapsulating shell in the carbon capture material prepared by needle-tube microfluidics comprised silicone acrylate (silicone acrylate—an Evonik product with a model of TEGO RAD 2650, which was a "photocrosslinkable" polymer). When used, 5% of a photoinitiator 2-hydroxy-2-methylacetone was added into the silicone acrylate.

Specifically, the method for preparing the carbon capture material prepared by needle-tube microfluidics was performed as follows:

(1) Preparation step of a microencapsulated sorbent:

(1.1) Sorbent: water was used as a solvent. Potassium carbonate and ethanolamine were dissolved in water in a weight percentage of 25-35%, obtaining an aqueous potassium carbonate solution and an aqueous ethanolamine solution, respectively. Graphene was added into the aqueous ethanolamine solution, and subjected to an ultrasonic treatment at 35-45° C. for 1-2 h to ensure uniform distribution of the nanoparticles in the solvent, obtaining an aqueous ethanolamine solution containing graphene sheets.

(1.2) microencapsulating shell: the shell was silicone acrylate (silicone acrylate—an Evonik product with a model of TEGO RAD 2650, which was a "photocrosslinkable" polymer). 3-8% of the photoinitiator 2-hydroxy-2-methylacetone was added into the silicone acrylate, mixed evenly and then subjected to a vacuum pumping to remove foams inside.

(2) Preparation of a needle-tube microchannel and MECS: The sorbent and the microencapsulating shell were passed through a needle-tube microfluidic device to form a core-shell double emulsion with the sorbent coated by the silicone acrylate, which was then cured by UV irradiation to form the carbon capture material.

Figure 1:
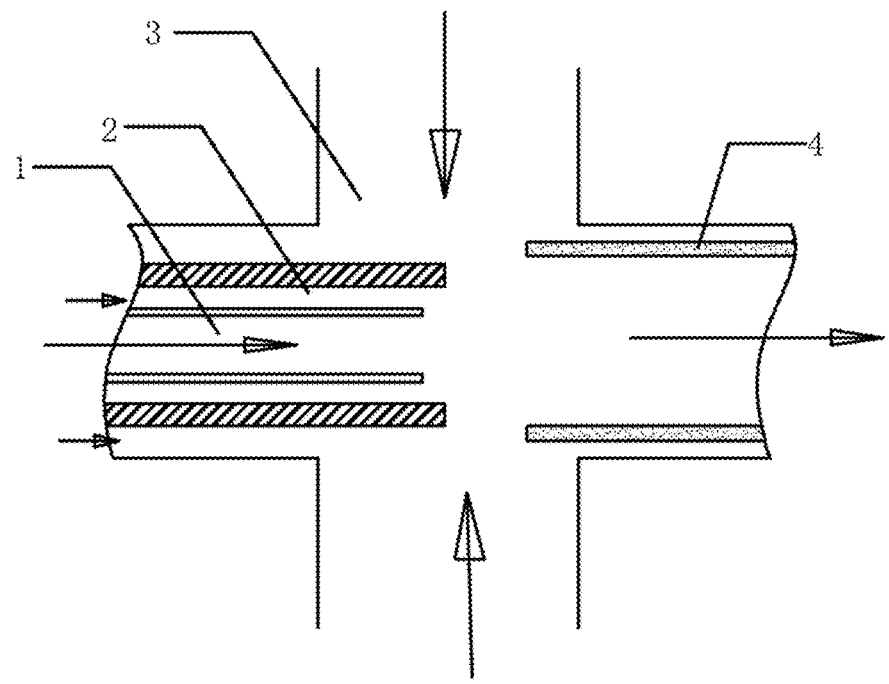
FIG. 1 is a schematic diagram of the microfluidic device (with glass capillary) for preparing the microencapsulated carbon capture sorbent according to the present disclosure.
Figure 2:
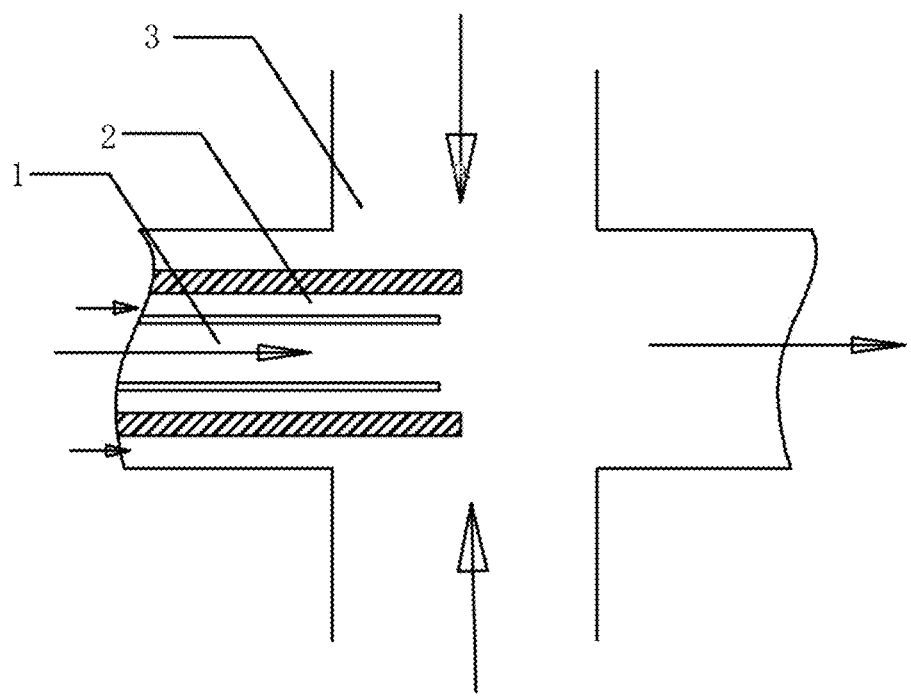
FIG. 2 is a schematic diagram of the microfluidic device (without glass capillary) for preparing the microencapsulated carbon capture sorbent according to the present disclosure.
Figure 3:
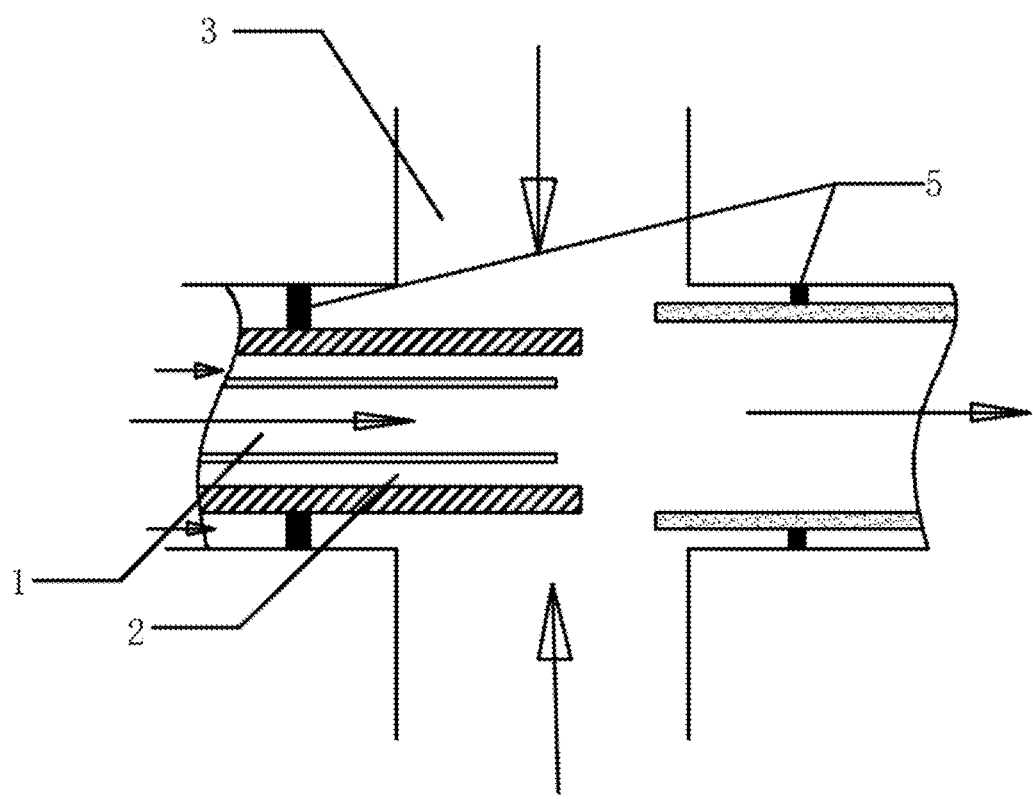
FIG. 3 is a schematic diagram of the microfluidic device (the end of the intermediate phase channel is extended into more than half of the cross position) for preparing the microencapsulated carbon capture sorbent according to the present disclosure.

As shown in FIG. 1-3, the needle-tube microfluidic device described in the present disclosure includes an internal phase microfluidic channel 1, an intermediate phase microfluidic channel 2 and an external phase microfluidic channel 3; the internal phase microfluidic channel is used for the flow of the sorbent (i.e. one of an aqueous potassium carbonate solution or an aqueous ethanolamine solution or an aqueous ethanolamine solution containing graphene sheets), the intermediate phase microfluidic channel is used for the flow of the silicone acrylate, and the external phase microfluidic channel is used for the flow of a glycerol solution; the internal phase microfluidic channel is arranged coaxially with the intermediate phase microfluidic channel and is located in the intermediate phase microfluidic channel, and the discharge end of the internal phase microfluidic channel is shorter than that of the intermediate phase microfluidic channel; the external phase channel is a cross-shaped channel, and the internal phase microfluidic channel and the intermediate phase microfluidic channel are located in a branch pipe of the external phase channel and extended into the cross position; the external phase is introduced from another two branch pipes perpendicular to the internal phase microfluidic channel and the intermediate phase microfluidic channel, and led out together with the internal phase and the intermediate phase from the branch pipe on the opposite side of the intermediate phase channel.

Specifically, as can be seen from FIG. 1 to FIG. 3, the external phase microfluidic channel 3 described in the present disclosure presents a cross-shape, and has four branch pipes. Every two branch pipes are arranged coaxially, and the two groups of branch pipes are perpendicular to each other. The internal phase microfluidic channel and the intermediate phase microfluidic channel are located in one of the branch pipes.

With the above structure, the flow rate of each phase and the shear force during collision could be effectively controlled, wherein the inner diameter of the internal phase is arranged to be smaller than that of the intermediate phase so as to facilitate the formation of stable dripping of the internal phase. At the same time, taking the factors such as the flow rate, the interfacial tension and viscosity of the internal and intermediate phases and co-flow into consideration, the structure with the above inner diameters is more reasonable, and the carbon capture particles finally obtained have a stronger sorption capacity.

As shown in FIG. 1 and FIG. 3, a glass capillary 4 is arranged in a branch pipe on the opposite side of the internal phase microfluidic channel 1 and the intermediate phase microfluidic channel 2 in the external phase microfluidic channel 3, the end of the glass capillary 4 is extended into the cross position of the external phase microfluidic channel, and the external phase, the internal phase and the intermediate phase are led out from the glass capillary. With such a structure, the flow rate of the corresponding phases in each pipe and the shear force during collision could be more reasonably controlled. Moreover, the glass capillary itself is hydrophilic, while the intermediate phase-formed double emulsion is hydrophobic, and thus the capillary realizes the export of the double emulsion for UV curing.

As shown in FIG. 1 and FIG. 3, the inner diameter of the glass capillary described in the present disclosure is greater than that of the intermediate phase microfluidic channel. The reason for using such a structure is that the particles formed would not adhere to the channel with a greater inner diameter of the capillary, so that the more complete and neater carbon capture material particles could be formed.

As shown in FIG. 1 and FIG. 3, a spacing is arranged between the end of the glass capillary described in the present disclosure at the cross position and the end of the intermediate phase microfluidic channel at the cross position. With such a structure, it is possible to control various shear forces of fluid by arranging the spacing, which is more conducive to the formation of carbon capture particles.

As shown in FIG. 1 to FIG. 3, the end of the intermediate phase microfluidic channel described in the present disclosure extended into the cross position is located at half or more of the inner diameter of the channel where the external phase enters. That is, the discharge end of the intermediate phase microfluidic channel should be located at half of the cross position of the external phase microfluidic channel or extended further toward the discharge end position. Such an arrangement could ensure a more desirable shear force of each phase, so as to achieve the formation of more desirable carbon capture particles.

As shown in FIG. 3, a blocking material 5 is arranged between the intermediate phase microfluidic channel and the external phase microfluidic channel described in the present disclosure, and a blocking material 5 is arranged between the glass capillary and the external phase microfluidic channel (the blocking material could be a glue). With such a structure, after being introduced from the two sides perpendicular to the intermediate phase, the external phase flows only to the side of the glass capillary, and forms the co-flow from the internal phase and the intermediate phase into the carbon capture particles through a shear force.

The average size of the microcapsules containing solvent prepared in the above examples is shown in Table 1:

TABLE 1

The average size of the microcapsules containing solvent prepared in the examples

| Core solvent | Average size of microcapsule (μm) | Deviation (μm) | Thickness of shell (μm) |
| --- | --- | --- | --- |
| Aqueous potassium carbonate solution with a mass percentage of 30% | 768.81 | ±14.26 | 73.71 |
| Aqueous ethanolamine solution with a mass percentage of 30% | 738.09 | ±18.56 | 67.74 |
| Aqueous ethanolamine solution containing graphene sheets with a mass percentage of 30% | 732.05 | ±12.52 | 65.56 |

The carbon capture particles obtained in the above examples are tested for performance. FIG. 4 shows a pressure drop setup, in which the particles prepared by the method of the present disclosure are tested for the carbon dioxide sorption kinetics. The total pressure of the device over a period of time is monitored to judge the size of the sorption force. Through testing, it could be found that the particles prepared with the above three different solvents in the present disclosure all have good sorption capacity.

FIG. 6 is a curve showing the sorption rate of MECS containing potassium carbonate with time at different temperatures, wherein the Y axis represents the sorption rate (micromole $s^{-1}$ $g^{-1}$ $bar^{-1}$). The reaction kinetics of the solvent and carbon dioxide is affected by temperature. The results show that an increase in the temperature helps to enhance the sorption rate, and the sorption rate reaches the maximum value at 60° C., which could, however, only be maintained for less than one minute.

FIG. 7 shows the sorption rate of MECS containing ethanolamine at different temperatures. The same results show that the increase in the temperature helps to enhance the sorption rate. The sorption rate reaches the maximum value at 40° C. and is also in a steady decline. The sorption capacity of MECs containing potassium carbonate and ethanolamine could not be directly compared, because the concentration and reaction kinetics of the two are different, either.

FIG. 8 shows a comparison of the sorption rate of nanofluids with different graphene sheets contents, and the highest content is one percent (1.0 vol %) of the total volume of the solvent. The figure shows that the sorption capacity of the nanofluids decreases with time, while the fluids with a higher content of nanoparticles have higher sorption capacity.

The overall enhancement factor of nanoparticles is obtained by calculating the ratio of the average carbon dioxide absorption rate of a nanofluid to that of a solvent containing only ethanolamine FIG. 9 illustrates the relationship between the enhancement coefficient and the loading of nanoparticles. It can be known from the above examples and the test results that the nanoparticles with a higher solid phase loading have a higher carbon dioxide absorption rate, and the convective motion in fluid could enhance the sorption effect of the nanoparticle-containing sorbents.

Specifically, the overall enhancement coefficient (E) of the nanoparticles for sorption is shown in the following formula:

$$E = \frac{\overline{\dot{n}_{CO_2^*}}}{\overline{\dot{n}_{CO_2}}}$$

$$\overline{\dot{n}_{CO_2}} = \frac{\int_0^t \dot{n}_{CO_2}}{t} = \frac{\int_0^t \frac{P\Delta V}{RT}}{t}$$

The E in the above formula is the overall enhancement coefficient of the nanoparticles for sorption, and the algorithm is the ratio of the average carbon dioxide absorption rate of the nanofluid to that of the solvent containing only ethanolamine

What is claimed is:

1. A method for preparing a carbon capture material prepared by needle-tube microfluidics, the method comprising:
    using water as a solvent, and dissolving potassium carbonate and ethanolamine in water in a weight percentage of 25-35% to obtain an aqueous potassium carbonate solution and an aqueous ethanolamine solution, respectively;
    adding graphene into the aqueous ethanolamine solution, and performing an ultrasonic treatment at 35-45° C. for 1-2 h to ensure uniform distribution of nanoparticles in the solvent to obtain an aqueous ethanolamine solution containing graphene sheets; and
    using silicone acrylate to obtain a shell; adding a photoinitiator 2-hydroxy-2-methylacetone into the silicone acrylate in a content of 3-8%, mixing and performing a vacuum pumping to remove foams inside to obtain a mixture; and
  passing the aqueous potassium carbonate solution or the aqueous ehtanolmine solution containing graphene sheets, and the mixture through a needle-tube microfluidic device to form a core-shell double emulsion with the aqueous potassium carbonate solution or the aqueous ethanolamine solution containing graphene sheets coated by the silicone acrylate, and curing by UV irradiation to form the carbon capture material.

2. The method of claim 1, wherein the needle-tube microfluidic device comprises an internal phase microfluidic channel, an intermediate phase microfluidic channel and an external phase microfluidic channel; the internal phase microfluidic channel is used for flow of the aqueous potassium carbonate solution or the aqueous ethanolamine solution containing graphene sheets, the intermediate phase microfluidic channel is used for flow of the silicone acrylate, and the external phase microfluidic channel is used for flow of a glycerol solution; the internal phase microfluidic channel is arranged coaxially with the intermediate phase microfluidic channel and is located in the intermediate phase microfluidic channel, and a discharge end of the internal phase microfluidic channel is shorter than that of the intermediate phase microfluidic channel; the external phase channel is a cross-shaped channel, and the internal phase microfluidic channel and the intermediate phase microfluidic channel are located in a branch pipe of the external phase channel and extended into the cross position; the external phase is introduced from another two branch pipes perpendicular to the internal phase microfluidic channel and the intermediate phase microfluidic channel, and led out together with the internal phase and the intermediate phase from a branch pipe on the opposite side of the intermediate phase channel.

3. The method of claim 2, wherein a glass capillary is arranged in the branch pipe on the opposite side of the internal phase microfluidic channel and the intermediate phase microfluidic channel in the external phase microfluidic channel, an end of the glass capillary is extended into the cross position of the external phase microfluidic channel, and the external phase, the internal phase and the intermediate phase are led out from the glass capillary.

4. The method of claim 2, wherein an inner diameter of the glass capillary is greater than that of the intermediate phase microfluidic channel; a spacing is arranged between the end of the glass capillary at the cross position and the end of the intermediate phase microfluidic channel at the cross position.

5. The method of claim 4, wherein the end of the intermediate phase microfluidic channel extended into the cross position is located at half or more of an inner diameter of the channel for introducing the external phase; a blocking material is arranged between the intermediate phase microfluidic channel and the external phase microfluidic channel, and is arranged between the glass capillary and the external phase microfluidic channel.

* * * * *